United States Patent
Jacobowitz et al.

(10) Patent No.: US 7,945,804 B2
(45) Date of Patent: May 17, 2011

(54) METHODS AND SYSTEMS FOR DIGITALLY CONTROLLED MULTI-FREQUENCY CLOCKING OF MULTI-CORE PROCESSORS

(75) Inventors: Lawrence Jacobowitz, Wappingers Falls, NY (US); Daniel J. Stigliani, Jr., Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 11/873,458

(22) Filed: Oct. 17, 2007

(65) Prior Publication Data

US 2009/0106576 A1    Apr. 23, 2009

(51) Int. Cl.
G06F 1/00  (2006.01)
G06F 1/04  (2006.01)
G06F 1/12  (2006.01)
G06F 15/16 (2006.01)

(52) U.S. Cl. ........ 713/501; 713/322; 713/375; 713/400; 713/500; 713/600; 709/200; 709/248

(58) Field of Classification Search .......... 713/322, 713/375, 400, 500, 501, 600
See application file for complete search history.

(56) References Cited

U.S. PATENT DOCUMENTS

| | | | |
|---|---|---|---|
| 5,086,387 A | | 2/1992 | Arroyo et al. |
| 5,481,573 A * | | 1/1996 | Jacobowitz et al. .......... 375/356 |
| 6,889,331 B2 * | | 5/2005 | Soerensen et al. ........... 713/320 |
| 6,963,992 B1 * | | 11/2005 | Cheng et al. .................. 713/501 |
| 7,002,415 B2 | | 2/2006 | Tsyrganovich |
| 7,061,944 B2 | | 6/2006 | DeCusatis et al. |
| 7,152,186 B2 | | 12/2006 | Airaud et al. |
| 7,263,457 B2 * | | 8/2007 | White et al. .................. 702/132 |
| 7,310,022 B2 * | | 12/2007 | Doi ................................. 331/34 |
| 7,486,754 B2 * | | 2/2009 | Uchida ......................... 375/356 |
| 2004/0128566 A1 * | | 7/2004 | Burr et al. ..................... 713/300 |
| 2004/0139362 A1 * | | 7/2004 | Inaba ............................ 713/322 |
| 2006/0041764 A1 * | | 2/2006 | Shih et al. ..................... 713/300 |
| 2006/0133559 A1 * | | 6/2006 | Glass ............................ 375/376 |
| 2006/0282692 A1 | | 12/2006 | Oh |
| 2007/0064852 A1 * | | 3/2007 | Jones et al. ................... 375/356 |
| 2008/0256381 A1 | | 10/2008 | Jacobowitz et al. |
| 2008/0282074 A1 | | 11/2008 | Jacobowitz et al. |

FOREIGN PATENT DOCUMENTS

JP    2004234182    8/2004

OTHER PUBLICATIONS

U.S. Appl. No. 11/734,375, filed Apr. 12, 2007.

* cited by examiner

Primary Examiner — Ji H Bae
(74) Attorney, Agent, or Firm — Cantor Colburn LLP; Steven Chiu (57) ABSTRACT

A method and system for digitally controlled multi-frequency clocking are provided. The method includes receiving a system reference oscillator clock frequency at a microprocessor including multiple cores. The system reference oscillator clock frequency provides a reference frequency to a local oscillator. The local oscillator supplies a core clock frequency to at least one of the cores. The method further includes adjusting the local oscillator to output the core clock frequency at a frequency greater than the system reference oscillator clock frequency as a function of digital frequency characteristic data associated with the core or cores. The method supports extendibility to larger systems and may support enhanced power management through frequency adjustments at the core level.

13 Claims, 7 Drawing Sheets

METHODS AND SYSTEMS FOR DIGITALLY CONTROLLED MULTI-FREQUENCY CLOCKING OF MULTI-CORE PROCESSORS

CROSS-REFERENCE TO RELATED APPLICATIONS

This application contains subject matter related to the subject matter of the following co-pending application, which is hereby incorporated herein by reference in its entirety: U.S. patent application Ser. No. 11/873,462 entitled METHODS AND SYSTEMS FOR A DIGITAL FREQUENCY LOCKED LOOP FOR MULTI-FREQUENCY CLOCKING OF A MULTI-CORE PROCESSOR, filed on Oct. 17, 2007.

BACKGROUND OF THE INVENTION

The present disclosure relates generally to computer system clocking, and, in particular, to digitally controlled multi-frequency clocking of multi-core processors.

Computer systems, such as servers, have encountered technology limitations associated with scaling performance by continuing to increase processor clock frequency. An approach being exploited in the industry to alleviate this bottleneck is the use of multiple processors working in synchronism to achieve higher performance. It has been shown that the scaling of these configurations for commercial use is approximately linear (sub-linear) with the number of processors but continues to scale with large numbers of processors. To date, the technique has been demonstrated for small numbers of processors (e.g., less than 100) at modest frequencies (e.g., less than 5 GHz). This approach usually contains multiple processor chips which are interconnected together with a clocking and data fabric to insure a quasi-synchronous structure. Silicon technology density improvements from generation to generation have enabled the placement of multiple processor cores on a processor chip to further the scaling of this paradigm.

This new paradigm, however, requires the distribution of a common clock to all the processor chips and cores. The increasing difficulty and hardware cost, as well as signal integrity concerns, associated with the transmission of high frequency clocking throughout a multi-chip and multi-core processor computer system make this an untenable long-term strategy for future systems. The state of the art for clock distribution is based on analog signals using transmission lines. This technique is limited in scalability due to skin effect, media and connector loss, crosstalk, termination mismatches, and the like. Today's large servers contain, for example, greater than 10 processor chips typically containing two cores. It is expected that demand for both the number of processor chips and cores per chip will increase in the future. Transmission of high frequency clocks (>5-10 GHz) for multiple chips, with multiple cores, in server systems is not feasible with known board technology and connectors. Operating this configuration in a tightly coupled mode, as a symmetric multi-processor (SMP), will require a new clocking paradigm.

Additionally, as chips become larger with more cores, regional process and parameter variability across a chip due to fabrication may result in each core having an optimal power/performance metric at a different chip voltage and clock frequency setting. As the chips get larger, the variability between the cores will increase. Obtaining optimum performance for each core within a multi-core system is not feasible today. Separate core fixed voltage domains are known, but they can only serve to optimize the power at the chip level and not obtain optimum chip performance.

Therefore, it would be beneficial to develop an approach to provide general processor clocking for multiple multi-core processor chip computer systems. Such an approach would enable a multiple processor computer system, e.g., a server, to maintain clock signal integrity and optimal frequency performance of each core independently, as well as higher total performance at a given power level. Conversely, power optimization on a processor core basis would also be advantageous. Further extendibility, as more cores per chip and larger chips exacerbate high frequency clock tree structures and optimization problems, would provide additional benefits. Accordingly, there is a need in the art for digitally controlled multi-frequency clocking in multi-core processor systems.

BRIEF SUMMARY OF THE INVENTION

Embodiments of the invention include a method for digitally controlled multi-frequency clocking. The method includes receiving a system reference oscillator clock frequency at a microprocessor including multiple cores. The system reference oscillator clock frequency provides a reference frequency to a local oscillator. The local oscillator supplies a core clock frequency to at least one of the cores. The method further includes adjusting the local oscillator to output the core clock frequency at a frequency greater than the system reference oscillator clock frequency as a function of digital frequency characteristic data associated with the core or cores. The method supports extendibility to larger systems and may support enhanced power management through frequency adjustments at the core level.

Additional embodiments include a system for digitally controlled multi-frequency clocking. The system includes a microprocessor including multiple cores and a local oscillator supplying a core clock frequency to at least one of the cores in response to a reference frequency received from a system reference oscillator clock frequency. The local oscillator is adjusted to output the core clock frequency at a frequency greater than the system reference oscillator clock frequency as a function of digital frequency characteristic data associated with the core or cores. The system supports extendibility to larger systems and may support enhanced power management through frequency adjustments at the core level.

Other systems and/or methods according to embodiments will be or become apparent to one with skill in the art upon review of the following drawings and detailed description. It is intended that all such additional systems and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments provide methods and systems for digital multi-frequency clocking in multi-chip and/or multi-core processor systems. In exemplary embodiments, a computer system (e.g., a server) clocking subsystem with a single system reference oscillator provides both a reference clock for the computer system and a reference for individual processor cores but is not used directly to generate the individual core clocks. The system reference oscillator is used to provide a level of synchronization for the individual core clocks, which may be tightly synchronized or loosely synchronized based on the platform architecture. Exemplary embodiments allow for both tightly or loosely synchronized processors (e.g., based on local oscillator design) simultaneously within the same platform or a combination thereof, including degrees of asynchronous optimization.

Clock distribution to each processor chip and core may be achieved with a digital data signal via a distribution network and a digitally controlled high-speed local oscillator as part of the core. The local core oscillator frequency may be determined by digital control data that can be used to set the core frequency of operation using digital signal processing or other digital means. The process of establishing, maintaining, and adjusting the high-speed local core oscillator frequency may be performed according to the disclosure of U.S. patent application Ser. No. 11/873,462.

In exemplary embodiments, the digital control data resides in system serial electrically erasable programmable read-only memory (SEEPROM) and is part of vital chip data for each chip. Each core may have a specified data field associated with it that contains unique data for the core (e.g., power consumption as a function of core operating frequency). The frequency can be established based upon a policy set by the computer system manufacturer or customer. For example, the frequency can be set to the maximum capability of each core based upon a particular voltage setting at a given temperature.

In exemplary embodiments, core clock frequency control information is sent to each core as a moderate speed (e.g., 10-100 Mb/s) digital control data signal, thereby avoiding problems associated with high-speed analog signal transmission. As digital data, the core clock frequency control information has high noise immunity and low signal distortion. The core clock frequency control information, also referred to as "vData" herein, may be sent as individual control data fields to each core. The vData may be latched into digitally controlled oscillator functions of the cores from system chip data held in the system SEEPROM of a master server or processing node. No further data transmission is required until the core clock frequency needs to be adjusted for conditions such as an environmental or policy change.

In exemplary embodiments, the single master reference oscillator is set at a moderate frequency (e.g., 10-100 MHz) which is also distributed to each core via analog transmission line techniques and re-drive circuits. This clock can be used to latch the data into registers within the core oscillator function, rather than to set the frequency directly. A change in the fundamental core operating frequency may not be required, such that a low speed reference is sufficient to provide a clock for digital signal processing functions associated with the digitally controlled oscillator.

Each core can run asynchronous or quasi-synchronously to each other and with respect to local cache. Once the different cores of a chip are asynchronous, some handshaking/buffering may be performed to transfer data between caches. Further details are provided herein.

Figure 1:
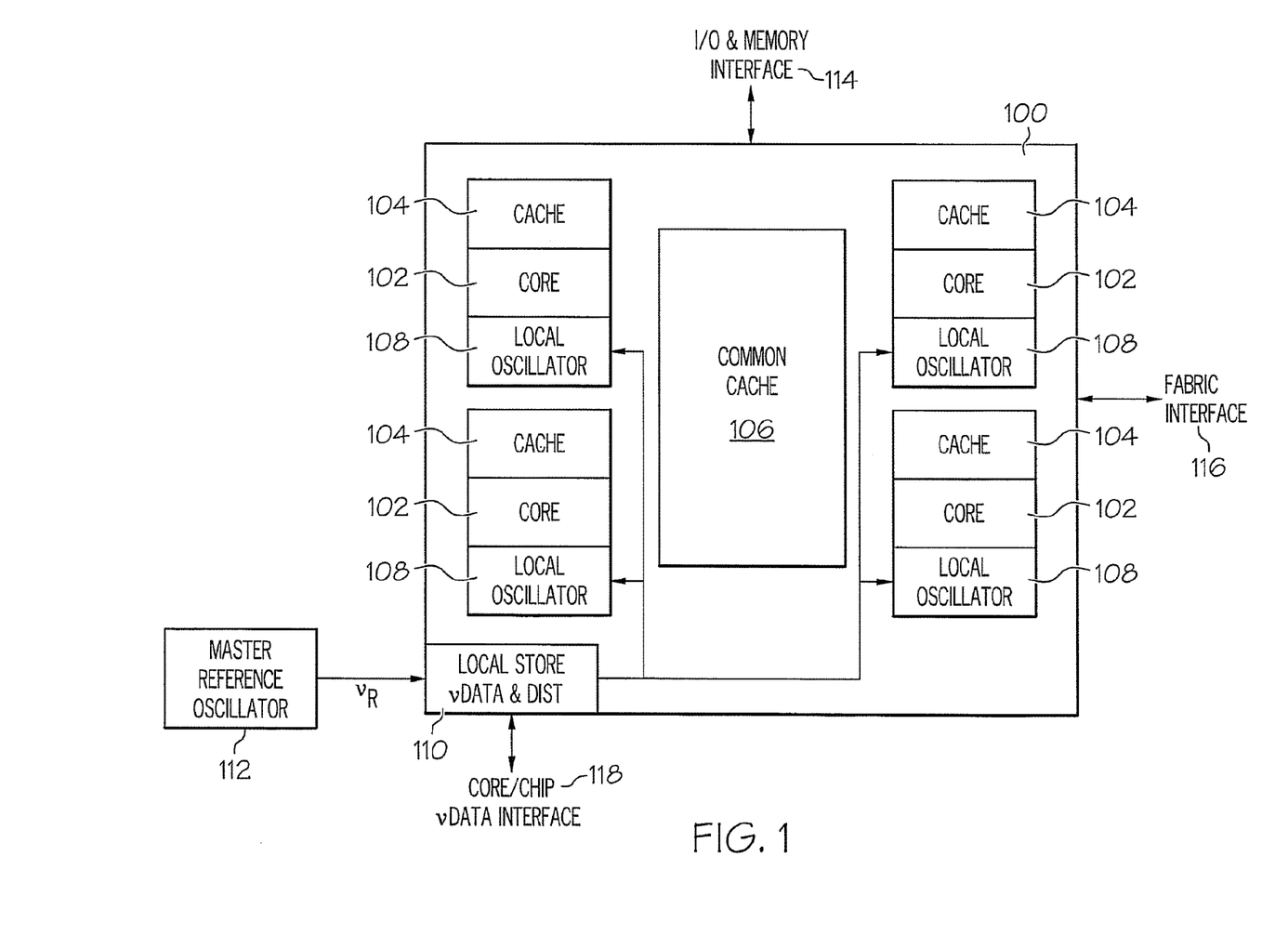
FIG. 1 depicts multi-frequency clocking of a multi-core processor chip in accordance with exemplary embodiments.

Turning now to the drawings, it will be seen that in FIG. 1 there is a block diagram of a microprocessor (μP) chip 100 upon which digitally controlled multi-frequency clocking is implemented in exemplary embodiments. The μP chip 100 of FIG. 1 includes four cores 102. The cores 102 provide independent processing engines, enabling parallel processing within the μP chip 100. Each core 102 can access a local cache 104, paired with the core 102, and a common cache 106 (e.g., a level-2 cache) shared between the cores 102. Independent digitally controlled clock generators, i.e., local oscillators 108, are used to clock each core 102 and local cache 104 pair synchronously, such that each core 102 can operate asynchronously to other cores 102 in the μP chip 100. In exemplary embodiments, the local oscillators 108 are digitally controlled with a frequency as determined by core clock frequency data stored in a local store vData and distribution function (LS&D) 110 in the μP chip 100. Each core 102 may have different core clock frequency settings, which can be optimized to reduce power consumption and heat dissipation at each core 102. The core clock frequency settings may be organized as one or more tables, enabling selection of higher frequencies for increased performance as a function of power dissipation, and vice versa. Power dissipation may be determined as a function of voltage at given temperatures. A master reference oscillator 112 provides a system reference oscillator clock frequency ($v_R$) that is used to gate digital vData into the LS&D 110 and also into the individual local oscillators 108. The local oscillator 108 output frequency can be adjusted to operate at an optimum point for each core 102 (e.g., maximum performance, lowest power), which may be above or below the mean operating frequency of total processor machine population for a larger system in which the μP chip 100 is incorporated.

In exemplary embodiments, the reference oscillator clock frequency ($v_R$) is a relatively low frequency such that it can be easily routed throughout a multi-chip module (MCM) or a printed circuit (PC) board without significant signal degradation, yet fast enough for clock synchronization updates sufficient to insure that the local oscillators 108 are stable and remain within the a deviation range of approximately 10-100 ppm (parts per million) across the computer system. For example, the reference oscillator clock frequency ($v_R$) may be approximately 10-100 MHz to control the local oscillators 108 running at frequencies ranging from approximately 5 to 10 GHz. The distribution of clock signals can be point-to-point for improved reference clock integrity but may be multi-drop for lower performance and lower cost configurations. Using a slower frequency clock to digitally command a local higher frequency clock may reduce issues associated with routing high frequency analog signals over long distances, such as skin effect, media and connector loss, crosstalk, termination mismatches, and the like.

While only four cores 102 are depicted within the μP chip 100, it will be understood that any number of cores 102 can be included within the scope of the invention. Since all of the cores 102 may be running asynchronously to the common cache 106, as well as other memory, a level of buffering can be provided between the cores 102 and the common cache 106 to accommodate the asynchronous nature of the interface. The μP chip 100 need not include separate caches 104 for each core 102 or the common cache 106 as depicted in FIG. 1. Each local oscillator 108 may also include a bypass mode to allow the master reference oscillator 112 or another core's local oscillator 108 to be used in the event that a given local oscillator 108 circuit fails, thereby providing a backup clock. The μP chip 100 may additionally include support interfaces for integrating the μP chip 100 into a larger computer system, such as an I/O and memory interface 114, a fabric interface 116, and a core/chip vData interface 118. The fabric interface 116 can be used to interconnect multiple μP chips 100 together to construct a larger multi-processor system, forming one or more MCMs, and supporting a symmetric multi-processing (SMP) configuration. In an SMP configuration, memory is coherent to the μP chips 100 within the SMP.

Figure 2:
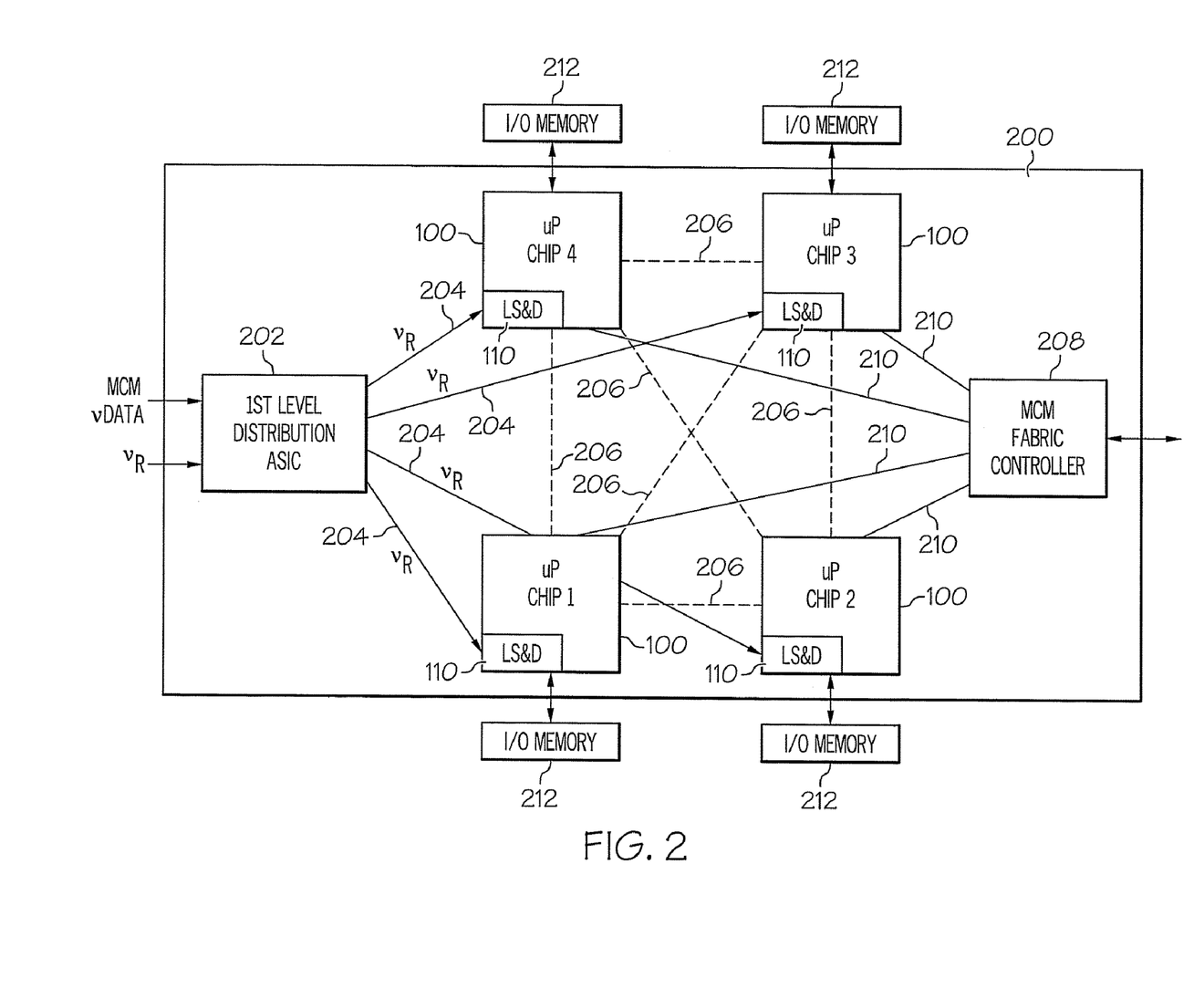
FIG. 2 depicts multi-frequency clocking of a processor multi-chip module in accordance with exemplary embodiments.
Figure 3:
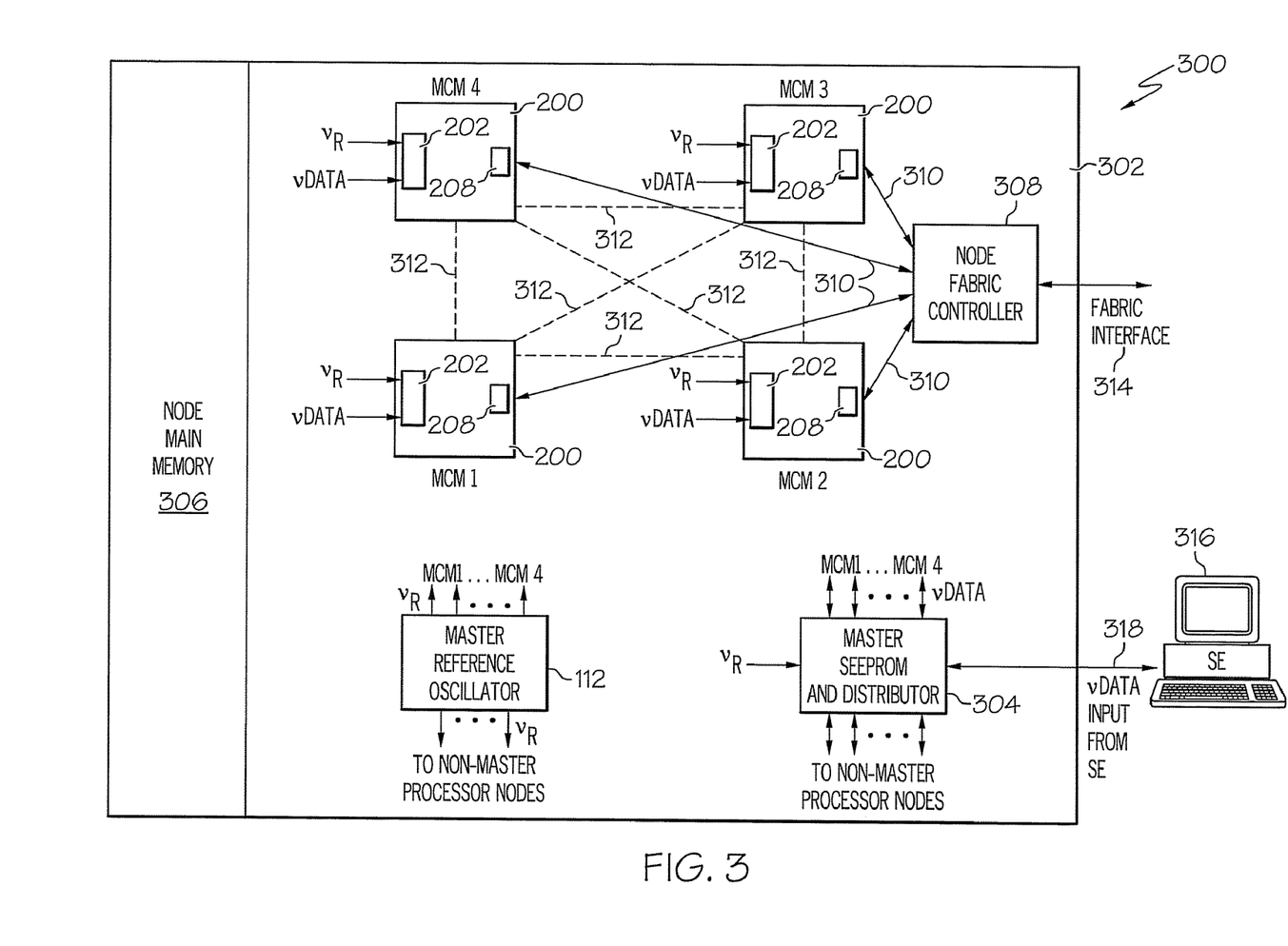
FIG. 3 depicts multi-frequency clocking of a master processor node in accordance with exemplary embodiments.

FIG. 2 illustrates an exemplary MCM 200 that contains four μP chips 100. Distribution of vData and the reference oscillator clock frequency ($v_R$) to the individual μP chips 100 is performed via a first-level distribution application specific integrated circuit (ASIC) 202 mounted on the MCM 200. The distribution ASIC 202 may parse or otherwise route any MCM-level vData to specific μP chips 100 for storage and configuration in the respective LS&Ds 110. The distribution ASIC 202 may represent any type of integrated circuit, a programmable logic device (PLD), or a combination of discrete components. In exemplary embodiments, clock wiring 204 between the distribution ASIC 202 and the μP chips 100 on the MCM 200 is point-to-point, with all of the μP chips 100 synchronized to the master reference oscillator 112 located on a master processor node 300 (e.g., a main server PC board), as illustrated in FIG. 3, used to synchronize multiple MCMs 200. Returning now to FIG. 2, the μP chips 100 of the MCM 200 are interconnected via an internal cluster fabric 206 to insure that SMP properties can be maintained. In exemplary embodiments, the μP chips 100 are also connected to a MCM fabric controller 208 via MCM fabric 210. The MCM fabric controller 208 may be used to interconnect several MCMs 200 together into a larger SMP node configuration. Additionally, each μP chip 100 may connect to I/O and memory subsystems 212, e.g., main system memory, which can be external to the MCM 200.

In alternate exemplary embodiments, the μP chips 100 are interconnected on multiple single chip modules (SCMs) mounted on a common glass epoxy PC board. This alternate packaging configuration may be used for smaller systems. The distribution ASIC 202 can be mounted on an SCM on a system board, and interconnection to each μP chip 100 can be made via system PC board wiring.

Turning now to FIG. 3, a master processor node 300 is depicted including a system level assembly 302 with several MCMs 200 interconnected using multi-frequency clocking of each MCM 200. The master processor node 300 contains the master reference oscillator 112 for the entire computer system as well as a master SEEPROM 304, which contains all the vData for each processor core within the computer system. The master processor node 300 is referred to as such since it includes both the master reference oscillator 112 and the master SEEPROM 304 that can be distributed to other nodes in a multi-node system. It is also the first node that is configured in a multi-node system, such as a server. The master processor node 300 may additionally include node main memory 306 to support functioning as a single board computer (e.g., a blade form-factor) without I/O. A node fabric controller 308 can be used to form a communication fabric between the MCMs 200 and additional nodes (not depicted). In exemplary embodiments, node fabric connections 310 connect the MCM fabric controller 208 of each MCM 200 to the node fabric controller 308. Intra-MCM communication may be performed via communication links 312, enabling exchanges of data between the MCMs 200 on the system level assembly 302 without passing the data to other nodes. The node fabric controller 308 may interface to other nodes via a fabric interface 314.

In exemplary embodiments, the master reference oscillator 112 is a high precision, crystal controlled, temperature and voltage compensated oscillator that provides a very accurate (less than 10 ppm) system clock.

The vData in the master SEEPROM 304 is a digital representation of optimum processor (core) frequencies along with identification (Id) of the appropriate chips and cores, such as the μP chips 100 and cores 102 of FIGS. 1 and 2. The Id information can be used to insure that the correct data is transmitted and stored in the LS&D 110 on each μP chip 100 for the cores 102. The vData may be derived from frequency characterization data, voltage characterization data, power characterization, and the like gathered by a service element (SE) 316. For example, optimum core operation frequencies may be determined by varying the local core clock frequency and power supply voltage (Vdd) to derive one or more curves for microprocessor component families. The SE 316 analyzes and reformats data into vData and loads the vData into the master SEEPROM 304 via a digital interface 318 (e.g. an inter-integrated circuit (I2C) bus). The SE 316 may be embodied as any form of computer device capable of writing to the master SEEPROM 304, such as a personal computer, workstation, or hand-held device. In alternate exemplary embodiments, the SE 316 is a subsystem within the same computer system as the master processor node 300 (e.g., a server subsystem). The totality of data gathered and analyzed by the SE 316 may be used to set the optimum frequency, voltage, and the like, for each core 102 to achieve the highest performance possible or other policy established by a customer. For example, "green" policies may be implemented to minimize aggregate power dissipation in the computer system, lowering operating cost as well as environmental impact through conserving power. Each node within the computer system, such as the master processor node 300, may perform workload monitoring at the system level, node level, MCM level, chip level, and/or core level. Event monitoring may be performed using closed loop autonomic servocontrol and/or additional sensor nets can be used to turn down the clock frequency and/or the power-grid point at the various levels. For example, power dissipation may be reduced by lowering local oscillator frequencies or power supply voltage (Vdd) to an idle or zero value, while targeting various levels of the system (e.g., node, MCM, μP chip, and/or core). The SE 316 may also enable in-field calibration of optimal operating conditions, such as degradation with time or environmental conditions.

The vData for each core/chip can be obtained during the chip test/verification stage in the manufacturing process or as part of a training program during initial power-on of the computer system. The latter approach may be part of the initialization and set-up process of the computer system. The SE 316 may implement the data collection process for each μP chip 100 and/or core 102, and subsequently load the vData into the master SEEPROM 304.

Using Id information in the vData, the master SEEPROM 304 can distribute and route the vData to corresponding μP chips 100 and cores 102 of FIGS. 1 and 2. The vData may be stored in the digitally controlled local oscillator 108 of each core 102 and then used to generate a core processor clock frequency until it is updated via a change to the master SEEPROM 304. In exemplary embodiments, the vData is not sent continuously from the master SEEPROM 304, but only upon an update. Thus, the core processor clock frequency of each core 102 can be updated upon an event driven basis to establish and maintain local high-speed digital clocking rather than requiring continuous high-speed analog clocking from the master reference oscillator 112.

Although the master reference oscillator 112 and the master SEEPROM 304 are shown as part of the master processor node 300, they may reside elsewhere within the computer system. In such as configuration, all nodes may be the same, with no node designated as the master processor node. Interconnections between various nodes within the computer system can be made via cables, including wire and/or optical connections.

Figure 4:
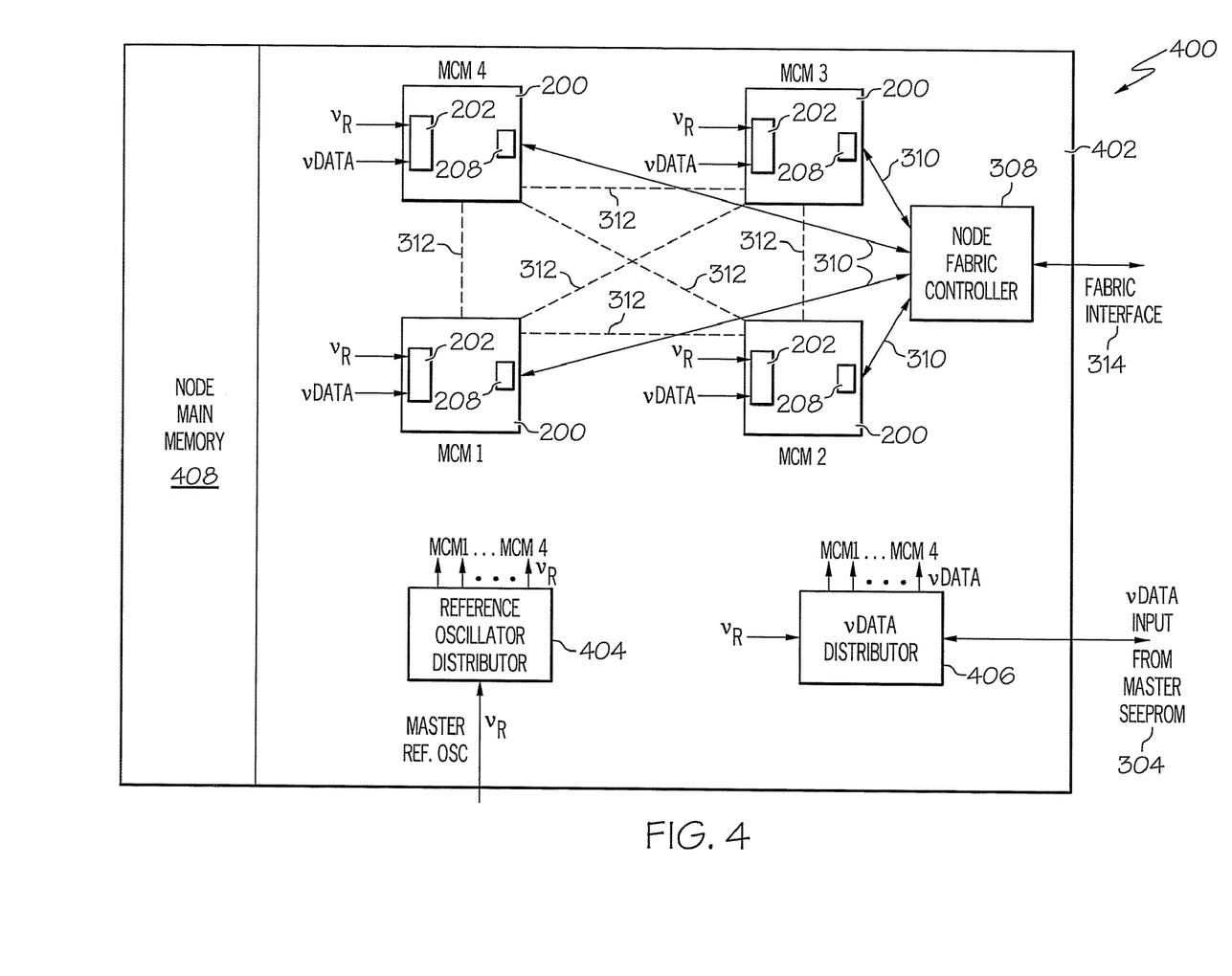
FIG. 4 depicts multi-frequency clocking of a non-master processor node in accordance with exemplary embodiments.

FIG. 4 illustrates clocking of a non-master processor node 400. Similar to the master processor node 300 of FIG. 3, the non-master processor node 400 includes a system level assembly 402 that further includes a node fabric controller 308 in communication with MCMs 200 and fabric interface 314 as described in reference to FIG. 3. Instead of a master reference oscillator 112 or master SEEPROM 304 as depicted on the master processor node 300, the non-master processor node 400 includes a reference oscillator distributor 404 and a vData distributor 406. If the master reference oscillator 112 or master SEEPROM 304 are located external to a node (such as with the non-master processor node 400), then all nodes can be the same, and the master processor node 300 is not required. In exemplary embodiments, all nodes contain a node fabric controller 308 to allow the attachment of multiple nodes, thereby building a very large clustered computer system. The non-master processor node 400 may also include node main memory 408 to support processing functions of the μP chips 100 and cores 102 of FIGS. 1 and 2 on the MCMs 200. It will be understood that additional elements known in the art to support a computer system are included (but not depicted) within the scope of exemplary embodiments, e.g., a user interface, power supply, I/O, and additional interfaces.

Figure 5:
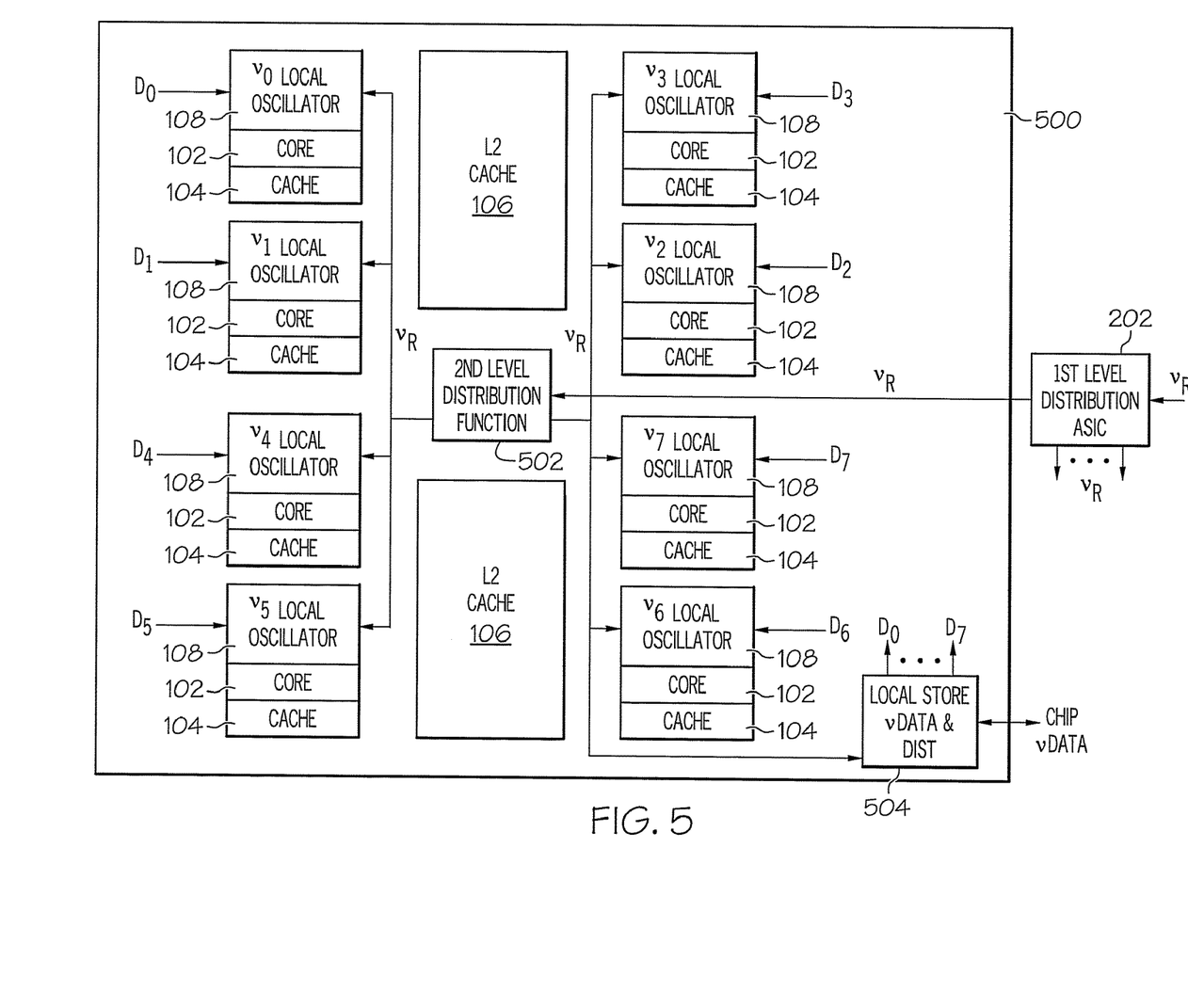
FIG. 5 depicts multi-frequency clocking of an alternate configuration of a multi-core processor chip in accordance with exemplary embodiments.
Figure 6:
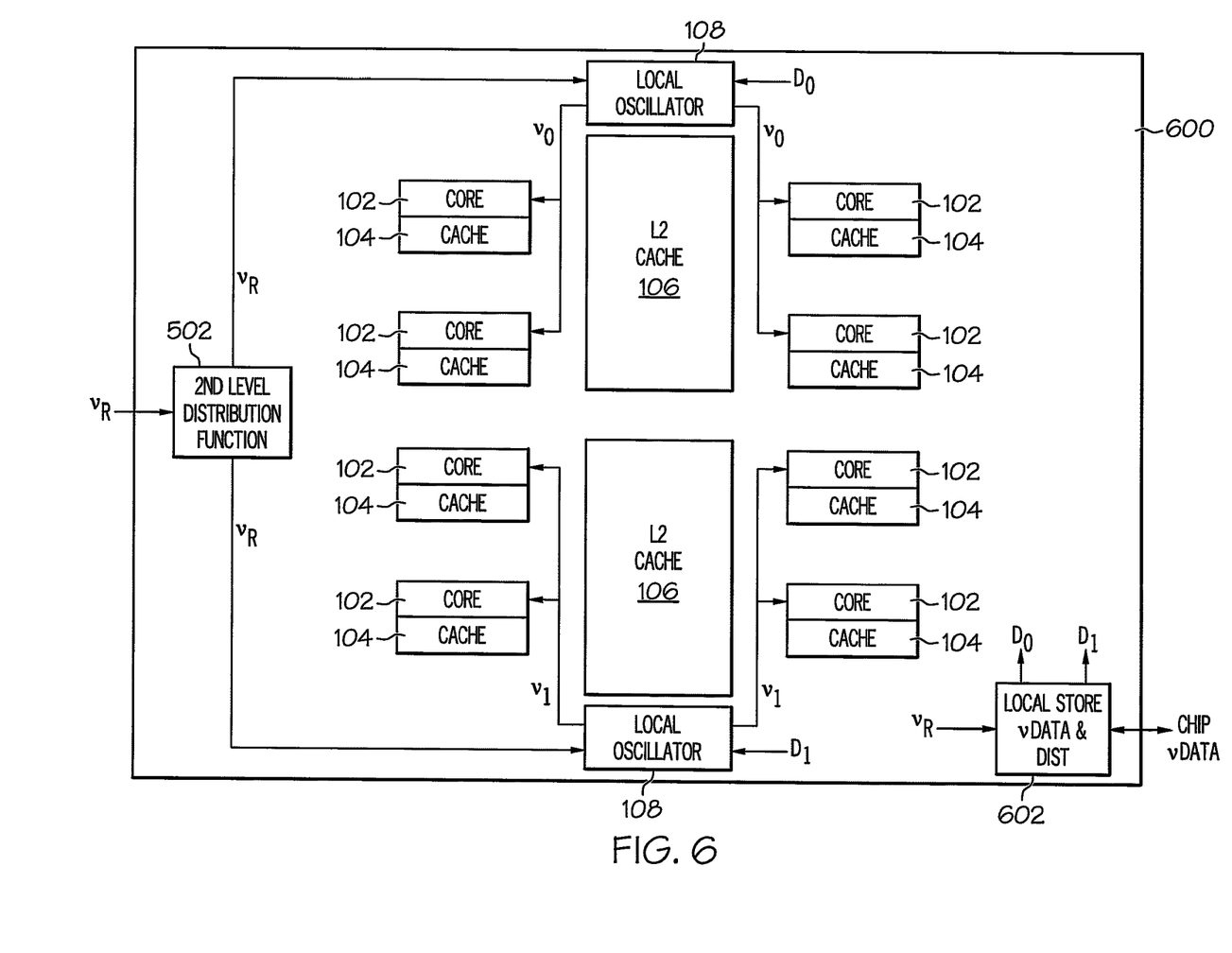
FIG. 6 depicts multi-frequency clocking of a multi-core processor chip sharing a local oscillator for multiple cores in accordance with exemplary embodiments.

FIGS. 5 and 6 depict further possible configurations for clock and data distribution to multiple cores within microprocessor chips 500 and 600. The exemplary μP chip 500 includes a second level distribution function 502 to distribute the system reference oscillator clock frequency ($v_R$) received from the first level distribution ASIC 202 to the local oscillators 108. The μP chip 500 includes multiple L2 (common) caches 106 shared between multiple cores 102, as well as local caches 104 and local oscillators 108 paired with each core 102. The μP chip 500 also includes a larger LS&D 504 to distribute vData to the eight local oscillators 108 as compared to LS&D 110 of FIG. 1. It will be understood that the exemplary μP chip 500 represents merely one example of scaling possibilities within a given microprocessor employing the inventive principles disclosed herein.

Similarly, the μP chip 600 represents an additional possible exemplary configuration that connects a local oscillator 108 to multiple cores 102. In this example, each core 102 has a corresponding local cache 104 and access to an L2 (common) cache 106. The second level distribution function 502 may be utilized to distribute the system reference oscillator clock frequency ($v_R$) to each local oscillator 108. The one-to-many local oscillator 108 to cores 102 configuration of FIG. 6 may be employed in designs where multiple cores 102 are grouped in different regions of the μP chip 600, e.g., north and south areas of the chip, with regional differences significant enough to justify separate local oscillators 108 for each region but not different enough at each core 102 to justify a local oscillator 108 for each core 102. The configuration depicted in FIG. 6 may also be advantageous to lower cost and complexity over the configuration of FIG. 5, while reducing flexibility at the core level. LS&D 602 may also be reduced in size and complexity as compared to the LS&D 504 of FIG. 5 and the LS&D 110 of FIG. 1, since fewer local oscillators 108 are adjusted.

Figure 7:
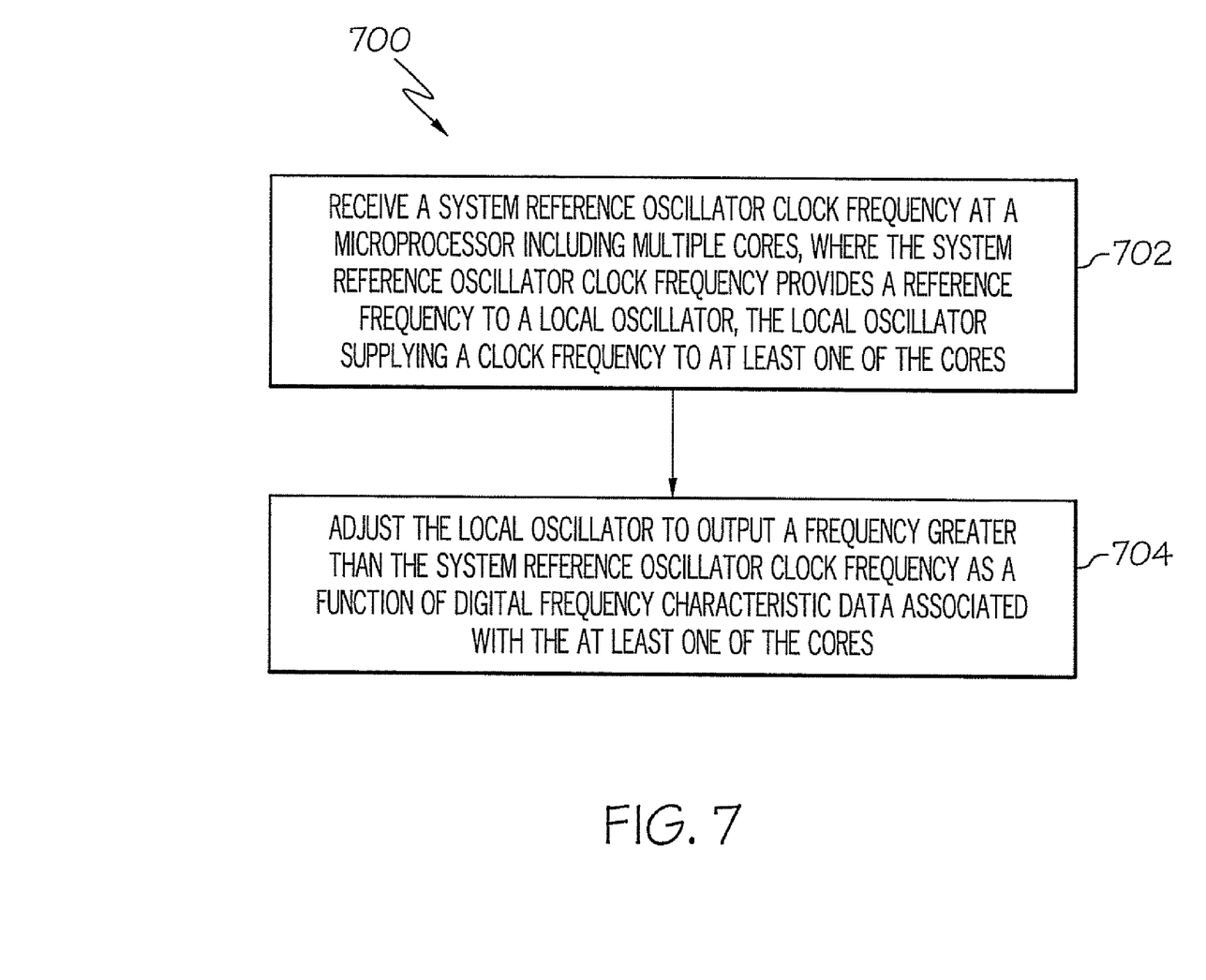
FIG. 7 depicts an exemplary process for multi-frequency clocking.

Turning now to FIG. 7, a process 700 for digitally controlled multi-frequency clocking will now be described in accordance with exemplary embodiments, and in reference to the FIGS. 1-6. At block 702, the μP chip 100 of FIG. 1 receives system reference oscillator clock frequency ($v_R$). The system reference oscillator clock frequency ($v_R$) provides a reference frequency to the local oscillators 108, which in turn supply a core clock frequency to the cores 102. The relationship of local oscillators 108 to cores 102 can be one-to-one (as depicted in FIGS. 1 and 5) or one-to-many (as depicted in FIG. 6). For example, a single local oscillator 108 can supply a core clock frequency to one core 102 or multiple cores 102 within the μP chip 100.

At block 704, the local oscillators 108 are adjusted to output frequencies that are greater than the system reference oscillator clock frequency ($v_R$) as a function of digital frequency characteristic data (vData) associated with the cores 102 which are connected to each local oscillator 108. For example, $v_R$ may be a relatively low frequency, such as 50 MHz, generated by the master reference oscillator 112. For a given operating scenario, one core 102 may have an optimum operating frequency of 5.0 GHz, while a second core 102 has an optimum operating frequency of 5.1 GHz, and yet a third core 102 can have an optimum operating frequency of 4.9 GHz, all in the same μP chip 100. Using the vData associated with each core 102 in the LS&D 110, each corresponding local oscillator 108 can be adjusted to the specific optimum operating frequency based upon the specific core 102 or cores 102 to which it is connected.

As previously described, the vData received at the LS&D 110 may be gated in using the system reference oscillator clock frequency ($v_R$). In exemplary embodiments, the vData is received at the LS&D 110 from a nonvolatile memory device, such as the master SEEPROM 304, which is external to the μP chip 100. The vData may include includes frequency settings to optimize core clock frequency as a function of the core clock frequency versus voltage at a given temperature or range of temperatures.

To form larger processing systems such as MCM 200 of FIG. 2, multiple μP chips 100 may be interconnected via a communication fabric, with $v_R$ and vData distributed to the multiple μP chips 100. Further scaling can be achieved through interconnecting multiple MCMs 200 into one or more nodes, such as master processor node 300 of FIG. 3 or non-master processor node 400 of FIG. 4. As system scaling increases, the advantages of digitally controlled multi-frequency clocking may become more apparent as a larger number of cores 102 are included into a single system with long signal paths.

Technical effects of exemplary embodiments include use of individual core clocks for workload management and to save power during server idle times by dynamically changing core clock frequency. Lowering the core clock frequency dynamically may reduce power consumption and heat dissipation. Further power management can be realized by controlling the power supply voltage (Vdd) to each core and/or chip. Thus, power management may be controlled through a combination of local core clock control and/or power grid control of the power supply voltage (Vdd) to reduce power consumption. The use of event frequency monitors to measure processing workloads in real-time enables workload management at the system level, servocontrolling power consumption to idle and/or turn off cores that are inactive. Additional technical effects include using a system reference oscillator clock frequency ($v_R$) to clock data in and out, such as clock information in a digital format, rather than generating local processor core clock frequencies as an analog multiple of $v_R$, enabling the use of a lower frequency system-wide clock and higher frequency local digitally controlled clocks. Further technical effects include programmable high-speed local digitally controlled clocks at the core level, with programmability at the system level for multiple cores in multiple microprocessor chips.

Advantages include a net performance gain of operating each core at its maximum frequency of approximately 10-20% potential improvement as compared to limiting a common core frequency to match the slowest core in a multi-core system. Employing a local store and distribution function for vData for individual chips versus on an MCM may simplify localized clock frequency control and scalability. Further advantages may include supporting extendibility to a cluster fabric between server frames when the nodes are in separate server frames. The inventive techniques disclosed herein can be applied to any processing platform that uses multi-core microprocessor chips, for example, servers, client microprocessor platforms, storage controllers, data communication switches, wireless communications devices, high-definition television equipment, and the like, which employ advanced solid-state clocking devices.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for digitally controlled multi-frequency clocking, comprising:
   receiving a system reference oscillator clock frequency at a microprocessor including multiple cores, wherein the system reference oscillator clock frequency provides a reference frequency to a local oscillator, the local oscillator supplying a core clock frequency to at least one of the cores;
   adjusting the local oscillator to output the core clock frequency at a frequency greater than the system reference oscillator clock frequency as a function of digital frequency characteristic data associated with the at least one of the cores;
   interconnecting multiple microprocessors via a communication fabric; and
   distributing the system reference oscillator clock frequency and the digital frequency characteristic data to the microprocessors, wherein the multiple microprocessors are grouped to form a multi-chip module (MCM), multiple MCMs are interconnected in a node supporting intra-MCM communication, and the node is one of a master processor node and a non-master processor node, the master processor node including
   a master reference oscillator to generate the system reference oscillator clock frequency; and
   a master nonvolatile memo device to hold the digital frequency characteristic data for the MCMs; and
   the non-master processor node including:
   a reference oscillator distributor to distribute the system reference oscillator clock frequency; and
   a data distributor to distribute the digital frequency characteristic data to the MCMs.

2. The method of claim 1 further comprising:
   receiving the digital frequency characteristic data at a local data store and distribution function in the microprocessor, wherein the local data store and distribution function gates in the digital frequency characteristic data using the system reference oscillator clock frequency.

3. The method of claim 2 wherein the digital frequency characteristic data is received at the local data store and distribution function from a nonvolatile memory device external to the microprocessor.

4. The method of claim 1 wherein the microprocessor further comprises dedicated independently digitally controlled local oscillators for each core, and the digital frequency characteristic data is provided on a per core basis via a local data store and distribution function.

5. The method of claim 1 wherein the digital frequency characteristic data includes frequency settings to optimize core frequency as a function of the core clock frequency versus voltage at a given temperature.

6. The method of claim 1 wherein the communication fabric is controlled by a fabric controller and the distributing of the system reference oscillator clock frequency and the digital frequency characteristic data is performed via a distribution application specific integrated circuit (ASIC).

7. The method of claim 1 further comprising:
   performing power management control via adjusting the local oscillator to output the core clock frequency as a function of processing workload.

8. A system for digitally controlled multi-frequency clocking, comprising:
   a microprocessor including multiple cores;
   a local oscillator supplying a core clock frequency to at least one of the cores in response to a reference frequency received from a system reference oscillator clock frequency, wherein the local oscillator is adjusted to output the core clock frequency at a frequency greater than the system reference oscillator clock frequency as a function of digital frequency characteristic data associated with the at least one of the cores;
   multiple microprocessors interconnected via a communication fabric; and
   a distribution application specific integrated circuit (ASIC) to distribute the system reference oscillator clock frequency and the digital frequency characteristic data to the microprocessors, wherein the multiple microprocessors are grouped to form a multi-chip module (MCM), multiple MCMs are interconnected in a node supporting intra-MCM communication, and the node is one of a master processor node and a non-master processor node, the master processor node including:
   a master reference oscillator to generate the system reference oscillator clock frequency; and a master nonvolatile memory device to hold the digital frequency characteristic data for the MCMs; and the non-master processor node including:

a reference oscillator distributor to distribute the system reference oscillator clock frequency; and a data distributor to distribute the digital frequency characteristic data to the MCMs.

9. The system of claim 8 further comprising:

a local data store and distribution function in the microprocessor, wherein the local data store and distribution function gates in the digital frequency characteristic data using the system reference oscillator clock frequency.

10. The system of claim 9 wherein the digital frequency characteristic data is received at the local data store and distribution function from a nonvolatile memory device external to the microprocessor.

11. The system of claim 8 wherein the microprocessor further comprises dedicated independently digitally controlled local oscillators for each core, and the digital frequency characteristic data is provided on a per core basis via a local data store and distribution function.

12. The system of claim 8 wherein the digital frequency characteristic data includes frequency settings to optimize core frequency as a function of the core clock frequency versus voltage at a given temperature.

13. The system of claim 8 wherein the local oscillator is adjusted to perform power management via outputting the core clock frequency as a function of processing workload.

* * * * *